United States Patent
Zelnik et al.

[15] 3,660,245
[45] *May 2, 1972

[54] APPARATUS FOR CONTINUOUS MANUFACTURE OF FURFURAL AND ACETIC ACID

[72] Inventors: Anrej Zelník; František Rendoš; František Kozmál; Radislav Domansky, all of Bratislava; Josef Pajtík, Zvolen, all of Czechoslovakia

[73] Assignee: Ceskoslovenska Akademie Ved, Prague, Czechoslovakia

[ * ] Notice: The portion of the term of this patent subsequent to May 2, 1987, has been disclaimed.

[22] Filed: May 21, 1965
[21] Appl. No.: 457,867

[30] Foreign Application Priority Data
May 22, 1964 Czechoslovakia .................. 2970-64

[52] U.S. Cl. .................. 202/99, 202/108, 202/121, 23/262, 201/25, 201/31
[51] Int. Cl. .................. C10b 49/10, C10b 1/04
[58] Field of Search .................. 202/99, 108, 109, 121, 222, 202/262; 201/16, 20; 260/347.9, 124; 23/263, 262

[56] References Cited

UNITED STATES PATENTS

| | | | |
|---|---|---|---|
| 2,676,908 | 4/1954 | Noel | 201/20 X |
| 2,784,203 | 3/1957 | McKee | 260/347.9 |
| 2,997,466 | 8/1961 | Ball et al. | 260/124 |
| 3,115,504 | 12/1963 | Asplund et al. | 260/347.9 |
| 3,251,716 | 5/1966 | Porter | 260/124 |
| 2,534,728 | 12/1950 | Nelson et al. | 201/31 X |

FOREIGN PATENTS OR APPLICATIONS 631,051  11/1961  Canada .................. 260/347.9

Primary Examiner—Norman Yudkoff
Assistant Examiner—David Edwards
Attorney—Michael S. Striker

[57] ABSTRACT

An apparatus for continuously producing furfural and acetic acid by thermodecomposition of ligneous and similar raw materials in the presence of the catalyst and in an inert atmosphere. A source of raw material is provided, a source of catalyst and a source of heated inert gaseous carrier. A drier is provided. Means are provided for conveying raw material and catalyst from the respective sources to the drier and for impregnating such raw material with the catalyst. Reactor means are provided and means for conveying impregnated raw material from the drier into the reactor means in a first direction. Pneumatic conveyor means conveys heated carrier from the respective source through and beyond the reactor means in a direction counter to the first direction so that the impregnated material yields distillate and solid particulate matter which is entrained by the carrier. Means are provided for separating the solid particulate matter from the carrier downstream of the reactor means. Condensor means separate distillate from the carrier downstream of the reactor means.

3 Claims, 1 Drawing Figure

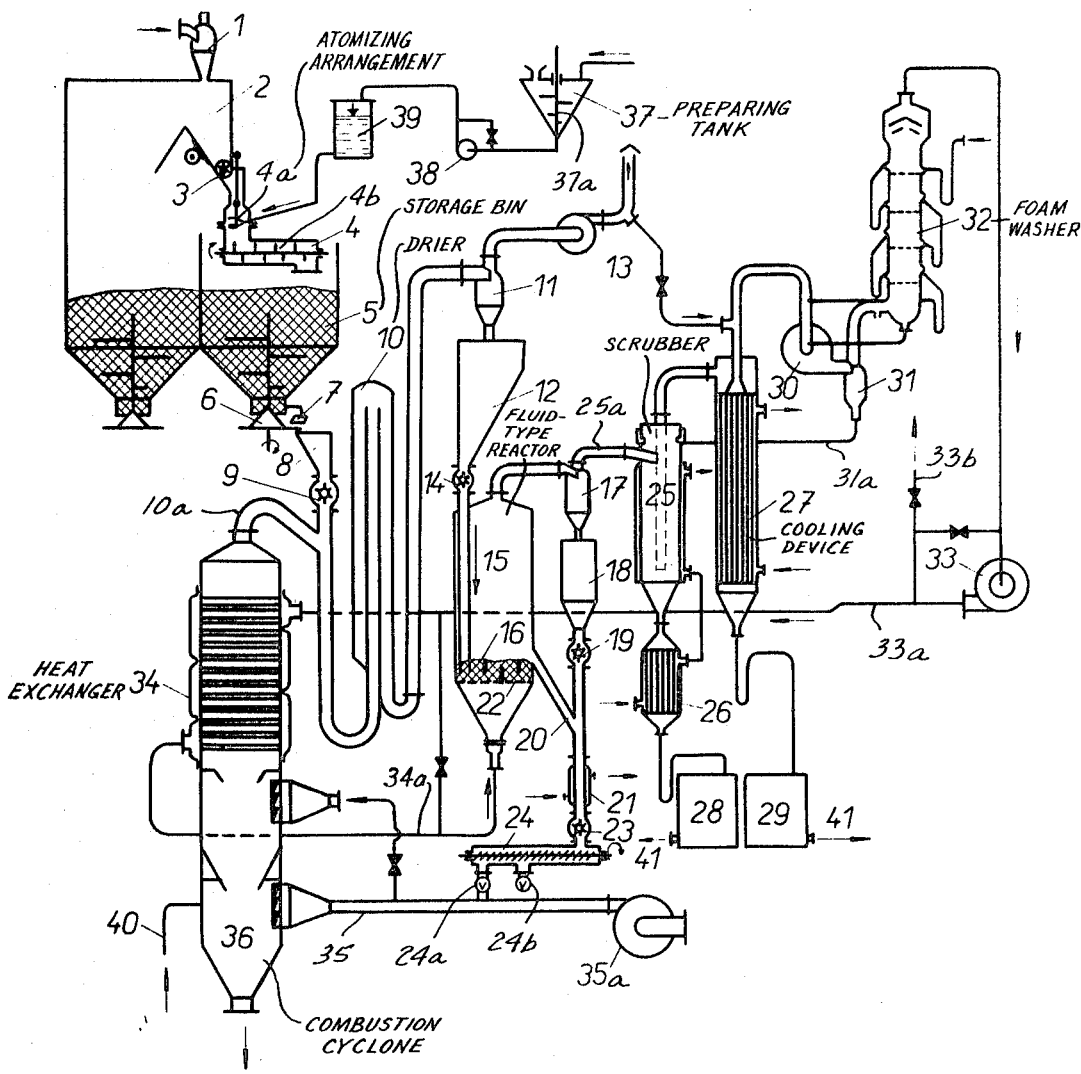

APPARATUS FOR CONTINUOUS MANUFACTURE OF FURFURAL AND ACETIC ACID

The present invention concerns a distillation arrangement.

More particularly, it concerns an apparatus for the continuous production of furfural and acetic acid.

Still more specifically, the present invention concerns an apparatus for the continuous production of furfural and acetic acid by thermal decomposition of ligneous and similar raw materials in the presence of a catalyst and in an inert atmosphere.

Both furfural and acetic acid, which find use in the paint- and other industries, are produced by decomposition of plant materials, such as ligneous materials, which contain the complex carbohydrates known as "pentosans." Various arrangements for obtaining the substances in question are known. Generally, these involve subjecting the raw materials to the influence of water vapor in pressure-type reactors of the intermittent or continuous type, and in the presence of catalysts with which the raw material is impregnated. Arrangements of this type suffer from various disadvantages, such as the need for pressure-type reactors which require a substantial investment, the requirement for the large quantities of steam used in operating the reactors, the need for extensive and therefore costly further processing of the distillate which is strongly diluted by the condensate, and finally the fact that the remaining lignocellulose waste generally must be discarded since it is wet and unsuitable for further use.

Another arrangement provides for the production of furfural by impregnating the raw materials with a catalyst and then processing the treated raw material in retorts by way of dry distillation. However, continuous production is impossible with this arrangement and the rather high temperatures involved (420° C) release not only furfural, but other distillation products from which it is difficult subsequently to isolate purefurfural.

It is therefore an object of the present invention to overcome the various disadvantages outlined heretofore.

A more specific object of the present invention is to provide an apparatus for the continuous production of furfural as well as acetic acid which is not subject to these disadvantages.

A still more specific object is to provide an apparatus for the continuous production of furfural and acetic acid by thermal decomposition of ligneous and similar raw materials, substantially at atmospheric pressure, in the presence of a catalyst and in an inert atmosphere.

Yet another object of the present invention is to provide an apparatus of the above-mentioned type in which the thermal decomposition of the impregnated raw material is carried out during movement of the same through the apparatus, thus facilitating continuous production.

Still another object of the present invention is to provide an apparatus of the above-mentioned type wherein the ligno-cellulose residue remaining after liberation of the distillation products need not be discarded, but is suitable for further use.

Finally, it is still another object of the present invention to provide an apparatus wherein the heat necessary for the thermal decomposition of the impregnated raw material is obtained by combustion of a portion of the ligno-cellulose residue remaining after liberation of the destination products.

In accordance with one feature of the present invention we provide, in an apparatus for the continuous production of furfural and acetic acid by thermal decomposition of ligneous and similar raw materials in the presence of a catalyst and in an inert atmosphere, a source of raw material; a source of catalyst; a source of heated inert gaseous carrier; a drier; a means for conveying raw material and catalyst from the respective sources to the drier and for impregnating such raw material with the catalyst; reactor means; means for conveying impregnated raw material into said reactor means in a first direction; pneumatic conveyor means for conveying heated carrier from the respective source through and beyond the reactor means in a direction counter to the first direction whereby the impregnated material yields distillate and solid particulate matter which is entrained by the carrier; means for separating the solid particulate matter from the carrier downstream of the reactor means; and precipitator means for separating distillate from the carrier downstream of the reactor means.

It will be clear from a consideration of the arrangement that the various disadvantages inherent in the prior-art constructions have thereby been avoided. Firstly, the impregnated raw material is continuously carried through the inventive apparatus and continuous production of furfural and acetic acid is thereby assured. The material need not accumulate for any given period of time at any point of the apparatus. Secondly, the apparatus operates substantially at atmospheric pressure and accordingly pressure-type reactors are not required. This permits vastly more economical construction of the reactors than heretofore possible, and thus reduces the investment necessary for the apparatus. Thirdly, the apparatus does not utilize water vapor and therefore does not require the use of steam. This results in a reduction of operating costs.

Additionally, the absence of steam eliminates the objectionable dilution of the distillate and thereby makes it possible to dispense with the previously required rather extensive processing steps in which the distillate was separated from the water. Finally, the ligno-cellulose residue remaining after furfural and acetic acid have been extracted is completely dry and may on the one hand be further processed to produce active carbon, briquettes, etc., while on the other hand a required quantity of the waste may be fed to the means for heating the gaseous inert carrier employed in the present apparatus, thereby reducing the operating costs still further.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

The single FIGURE shows the apparatus of the present invention in a schematic representation.

As seen in the drawing, raw material is introduced from a remote source of supply (now shown) into a separating cyclone 1. In the cyclone 1 the raw material, which may be sawdust or the like, is processed so as to eliminate lumps or cakes formed during storage. From cyclone 1 the material is introduced into an auxiliary storage bin 2 from where it is continuously introduced by a driven measuring-gate 3 into an impregnation device 4 which comprises an atomizing arrangement 4a and a conveying means, such as a worm conveyor 4b. A suitable catalyst, prepared in a remotely-located preparing tank 37 provided with a stirring device 37a, is forwarded therefrom by a pump 38 to a working-reservoir 39 from where it is supplied to the atomizing device 4a. As the raw material passes by or through the atomizing device 4a it is intimately impregnated with the catalyst and is then transported by the worm conveyor 4b into the storage bin 5 for processed material.

From the storage bin 5 the impregnated raw material is introduced by means of a driven rotary table feeder or dosing plate 6, and a wiping knife 7 cooperating therewith, into the feed hopper 8 from where it is continuously forwarded by a driven measuring-gate 9 into the drier 10. A heat exchanger 34, to be described later on, introduces combustion gases into the heater 10 just downstream of the measuring-gate 9. The combustion gases so introduced serve to transport the impregnated raw material through the heater 10, as well as to dry it on its passage therethrough. Downstream of the heater 10 the material passes into a cyclone 11 where it is separated from the combustion gases, which latter are exhausted by means of the fan 13 and may be let out into the atmosphere.

The impregnated and now dried material passes from cyclone 11 into the feed hopper 12 and is continuously introduced therefrom by means of a driven measuring-gate 14 into a non-pressurized fluid-type reactor 15, formed adjacent its lower end with a grate 22 and with partition walls 16 arising upwardly from the grate 22. An inert gaseous carrier, derived from heat exchanger 34, is fed through conduit 34a into the lower end of the reactor 15 downwardly of the grate 22 at a temperature of from 180° to 260° C, preferably 220° C. At this temperature thermal decomposition of the material takes place in reactor 15 and the resulting distillation products are carried off at the upper end of the reactor 15 by the gaseous carrier. Since the latter inevitably carries with it a certain amount of particulate impurities, such as fly ash or the like, it is made to enter — together with the distillation products it entrains — a cyclone 17 where the particulate impurities are removed from carrier and distillation products. The impurities then pass from cyclone 17 into an intermediate storage bin 18 from where they are admitted by a driven measuring-gate 19 into a cooler 21. The ligno-cellulose residue, which accumulates in the reactor 15, also is conducted to the cooler 21 by means of an overflow conduit 20 which conducts it out of the reactor 15 when the residue reaches a predetermined level. After being subjected to cooling in cooler 21, the combined ligno-cellulose residue and the particulate impurities removed in cyclone 17 are then passed by a measuring-gate 23 onto a suitable conveyor means, such as a worm conveyor 24.

The conveyor means 24 is suitably provided with at least two outlets. One of these outlets, controlled by a valve means 24a, serves to conduct a predetermined quantity of the residue to a combustion cyclone 36 where the material is burned and its heat is made available to the heat exchanger 34. In the embodiment illustrated in the drawing the material is conducted from the conveying means 24 to the combustion cyclone 36 by means of a conduit 35 into which it is introduced and along which it is transported by the action of a fan 35a until it enters the combustion cyclone 36. The other outlet of conveying means 24, controlled by a control valve 24b, serves to discharge the amount of residue not needed for operation of the combustion cyclone 36; the discharged material is then led away in any suitable manner for further processing.

After being freed of impurities in the cyclone 17 the gaseous carrier, together with the entrained distillation products, passes through a conduit 25a which opens tangentially into a scrubber 25. In the scrubber 25 the carrier is partly cooled and a portion of the distillate condenses and is led off through heat exchanger 26 into storage bin 28. The carrier with the remaining entrained distillation products then passes from the scrubber 25 into another cooling device 27 where a major part of the distillate (i.e., furfural and acetic acid) condenses and is led away to storage bin 29 from where it may be conducted to suitable further processing stations by means of condensate piping 41.

Since traces of the distillation products still remain in the inert carrier at this point, the carrier passes from cooling device 27 into a centrifugal separator 30, which in principle is a centrifugal fan driven by a suitable means. Washing solution from the bottom partition of a foam washer 32, constructed as a known sieve column with attachments for the overflow of the liquid phase outside the column, is fed into the suction piping of fan 30 and the solution is atomized by the fan and blown into a cyclone 31 where it is separated from the gaseous carrier. The carrier with the remaining distillation products then passes into the foam washer 32 where the remaining distillation products are retained in the washing liquid. It should be noted that in the foam washer the washing liquid is fed counter-current to the direction of movement of the carrier and is enriched on each stage of the washer with the distillation products. After leaving foam washer 32 the now completely purified carrier is transported to the heat exchanger 34 by means of a fan 33 and a conduit 33a connecting the foam washer with the heat exchanger 34. Excess quantities of carrier, not needed for operation of the heat exchanger 34, are discharged to the atmosphere at 33b.

The apparatus herein described is highly efficient and yields 7 percent of furfural, 7 percent of acetic acid, and 75 percent of ligno-cellulose residue, all calculated on the basis of completely dry sawdust. The concentration of furfural in the condensate resulting from operation of the apparatus is in excess of 10 percent, and the same is true of the concentration of acetic acid. The combustion heat of the ligno-cellulose residue, which latter, it must be remembered, has been being discarded in the arrangements known from the prior art, is 5500 Kcal/kg, so that the residue produced as a result of operation of the inventive apparatus represents a very valuable by-product.

It will be understood that each of the elements described above, or two or more together, may also find a useful application in other types of distillation apparatus differing from the types described above.

While the invention has been illustrated and described as embodied in apparatus for the continuous production of furfural and acetic acid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly consitutute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for continuous production of furfural and acetic acid by thermal decomposition of ligneous raw materials in the presence of a catalyst and an inert atmosphere comprising, a hopper for said raw material, means introducing a catalyst to the hopper impregnating the raw material, a source of inert gaseous carrier, a drier, means for pneumatically conveying raw material and catalyst from the hopper to said drier, said drier formed of concentric cylinders with an inlet means at the bottom of the inner cylinder opening into the surrounding cylinder, reactor means, means having a downcomer extending from the top of the reactor and opening above a perforated floor in the reactor to form a bed of material therein, pneumatic means for introducing said heated carrier gas from its source upwardly through the bed, whereby the impregnated material yields vapor and solid particulate matter both of which are entrained by the carrier gas, the said reactor having a side outlet for continuous removal of excess bed material, means for separating solid particulate matter from the carrier gas and vapor down stream of said reactor means and condenser means for condensing vapor into a distillate from carrier gas down stream of said reactor means.

2. In an apparatus for continuous production of furfural and acetic acid by thermal decomposition of ligneous and similar raw materials in the presence of a catalyst and in an inert atmosphere, a source of raw material; a source of catalyst; a source of heated inert gaseous medium; a drier; means for impregnating said raw material with said catalyst; means for pneumatically conveying catalyst-impregnated raw material to said drier; reactor means having a perforate floor; means for conveying catalyst-impregnated dried raw material from said drier into said reactor means and for discharging it above said floor to form a bed thereon; pneumatic conveyor means for conveying heated inert gaseous medium from said source of heated inert gaseous medium from beneath said floor through said bed and beyond said reactor means in a direction counter to said first direction whereby said impregnated material yields vapor and solid particulate matter both of which are entrained by said heated inert gaseous medium; outlet means in said reactor means for enabling continuous removal of excess bed material; means for separating solid particulate matter from said heated inert gaseous medium and said vapor downstream of said reactor means; and condenser means for condensing vapor into a distillate from said heated inert gaseous medium downstream of said reactor means.

3. In an apparatus as defined in claim 2, and further comprising washing means downstream of said condenser means for separating residual distillate from said inert gaseous medium.

* * * * *